Oct. 28, 1941.    W. RUDDOCK    2,260,539
TRACTOR SHOVEL
Filed Dec. 26, 1939    4 Sheets-Sheet 1

Inventor:
William Ruddock.
Edmund A. Strauss
Attorney.

Oct. 28, 1941.   W. RUDDOCK   2,260,539
TRACTOR SHOVEL
Filed Dec. 26, 1939   4 Sheets-Sheet 2

Inventor.
William Ruddock.
Edward G. Stauss
Attorney.

Oct. 28, 1941.  W. RUDDOCK  2,260,539
TRACTOR SHOVEL
Filed Dec. 26, 1939  4 Sheets-Sheet 3
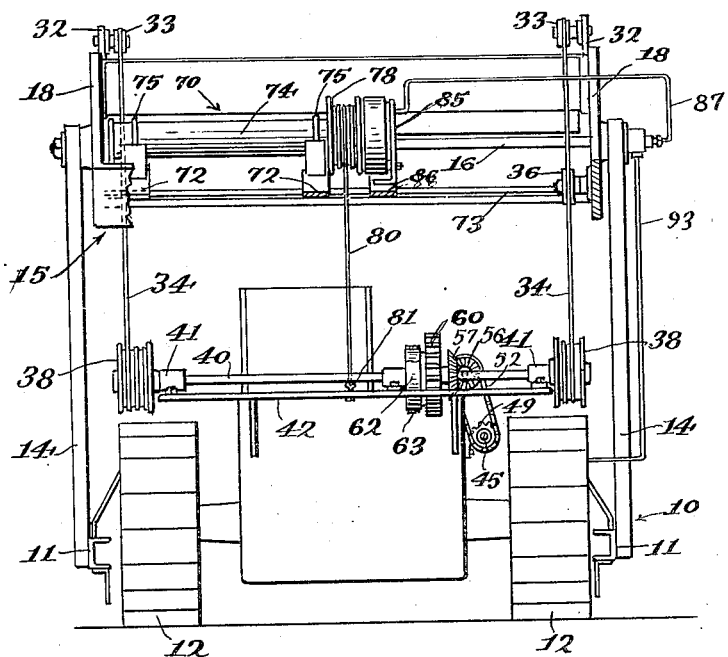
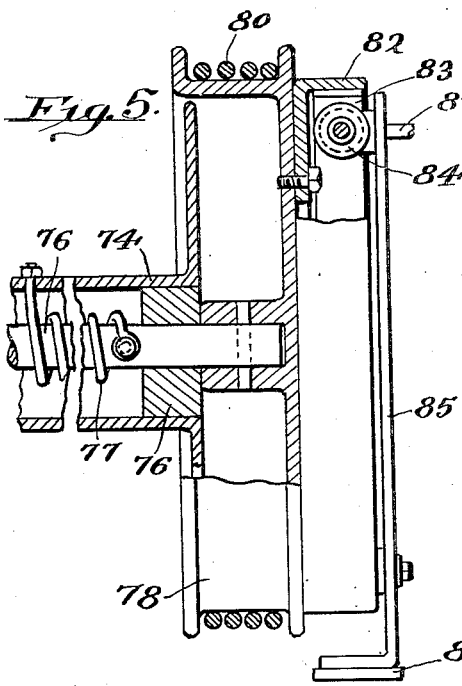
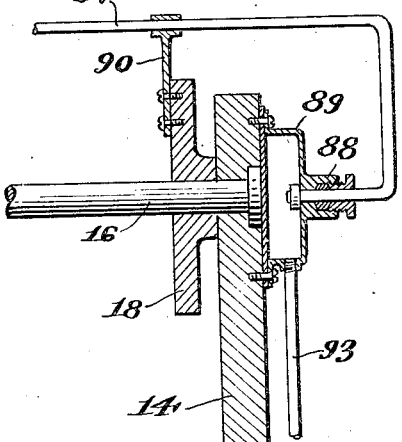
Inventor:
William Ruddock
Edward G. Strauss
Attorney.

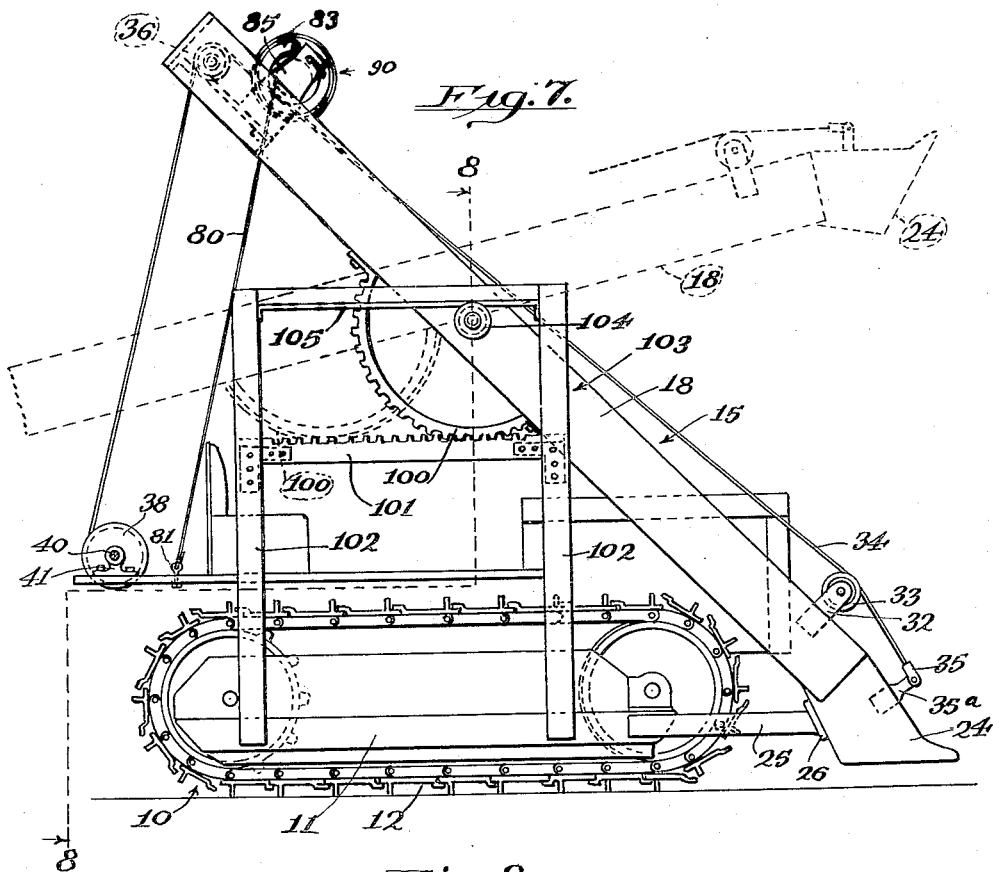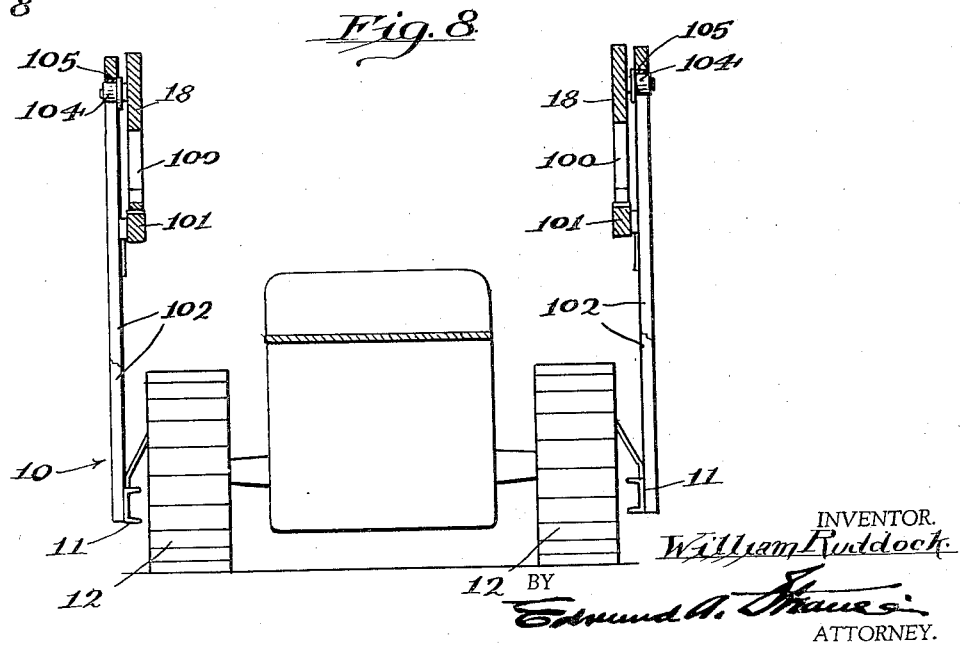

Patented Oct. 28, 1941

2,260,539

UNITED STATES PATENT OFFICE 2,260,539

TRACTOR SHOVEL

William Ruddock, South Pasadena, Calif., assignor of one-half to Marion P. McCaffrey, Los Angeles, Calif.

Application December 26, 1939, Serial No. 310,940

12 Claims. (Cl. 214—140)

This invention relates generally to power shovels and more particularly to shovels mounted on and operated by a tractor "caterpillar."

Apparatus of the above character has heretofore been devised to operate in connection with "caterpillar" tractors, with the dipper mounted on the forward or front end of the tractor and movable in a vertical plane during its operation.

While this arrangement serves its intended purpose the tractor's equilibrium oftentimes becomes unbalanced due to excess weight on the front end thereof thereby causing strains on the frame work of the same, as the dipper moves in a vertical plane.

It is therefore an object of the present invention to provide a shovel construction mounted on and operated by a tractor in such a manner that it will perform the functions of a power shovel of usual construction.

Another object is to provide an excavating apparatus in which the shovel member may be forced into the material to be moved without incurring undue strain on any part of the apparatus.

A further object is to provide an excavating apparatus of the movable beam type in which the loaded excavator secured thereto will be retained in an elevated counterbalanced position.

Still a further object is to provide an excavating apparatus in which the movement of the excavator from a filling to a discharging position will permit a convenient discharge of the excavated material.

Other objects and advantages will be apparent from the following specification, reference being had to the drawings accompanying the same in which:

Fig. 4 is a rear elevation taken in the direction indicated by the arrow 4 of Fig. 2.

Fig. 5 is a fragmentary detail section through the automatic winder as indicated by line 5—5 of Fig. 2.

Fig. 6 is a detail section taken on line 6—6 of Fig. 2.

Fig. 7 is a side elevation of a modified form of apparatus.

Fig. 8 is a vertical section taken on line 8—8 of Fig. 7.

Figure 1:
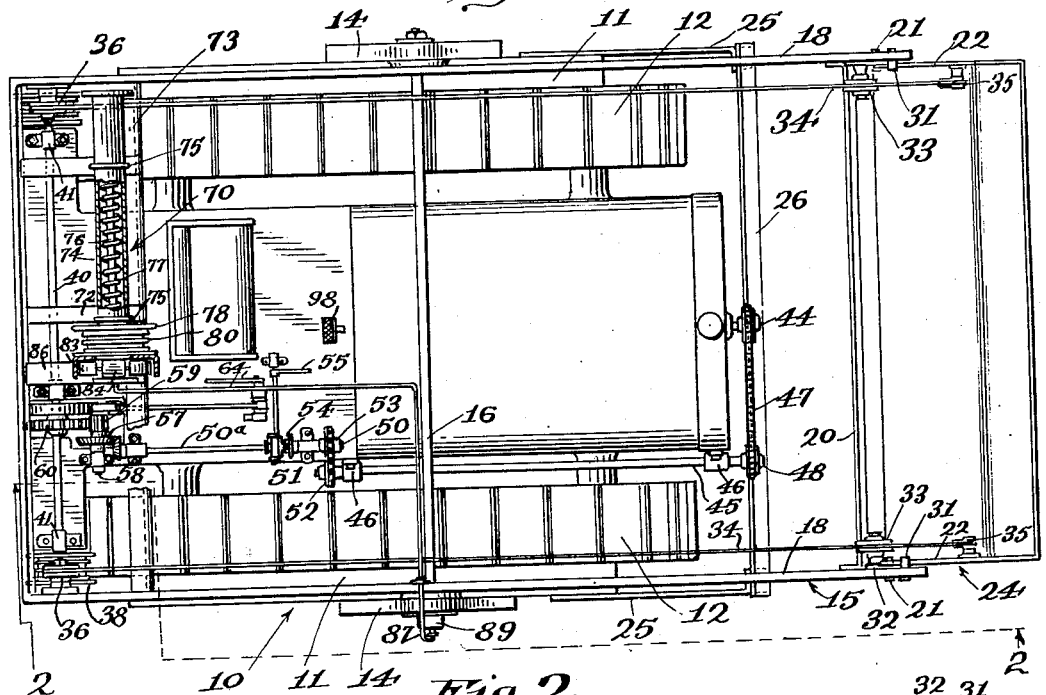
Fig. 1 is a top plan view of the apparatus of the present invention incorporated with a "caterpillar" tractor.

Briefly stated the invention includes a beam pivotally mounted on the tractor frame, a dipper pivotally mounted on the beam adjacent its forward end, a hoisting mechanism for raising the dipper operable by the engine of the tractor, and means mounted on the beam for holding the dipper in elevated position, whereby it may be held in such position and the tractor moved to a position for discharging the contents of the dipper, said means also serving to counterbalance the weight of the loaded dipper during raising of the same and to retard its downward movement.

Referring more specifically to the drawings, 10 designates a tractor of the "caterpillar" type driven by a "Diesel" engine or other suitable power means including side frame rails 11 and tractor treads 12.

The present invention more specifically relates to a power shovel and apparatus for operating the same mounted on and operable by the motive power of the tractor as previously referred to. Rigidly secured to the side frame rails 11 are standards 14 that pivotally support therebetween a beam 15 mounted on a horizontally disposed shaft 16 adjacent their upper ends.

Figure 3A:
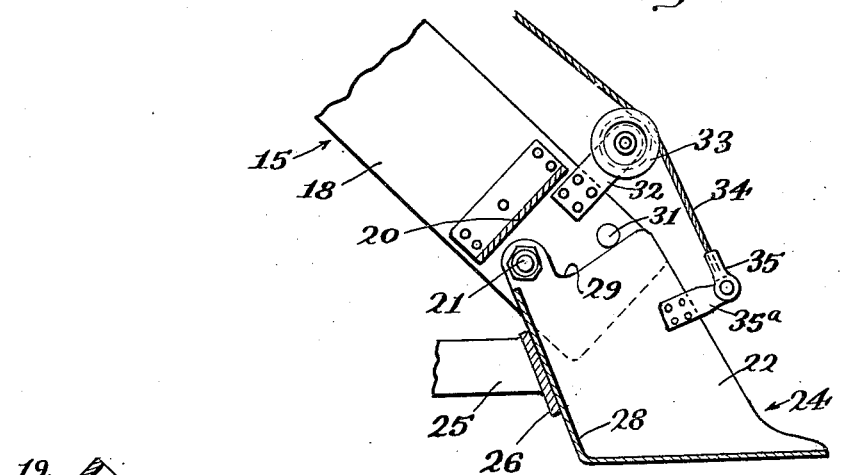
Fig. 3A is an enlarged detail section showing the mounting of the dipper on the beam.
Figure 3:
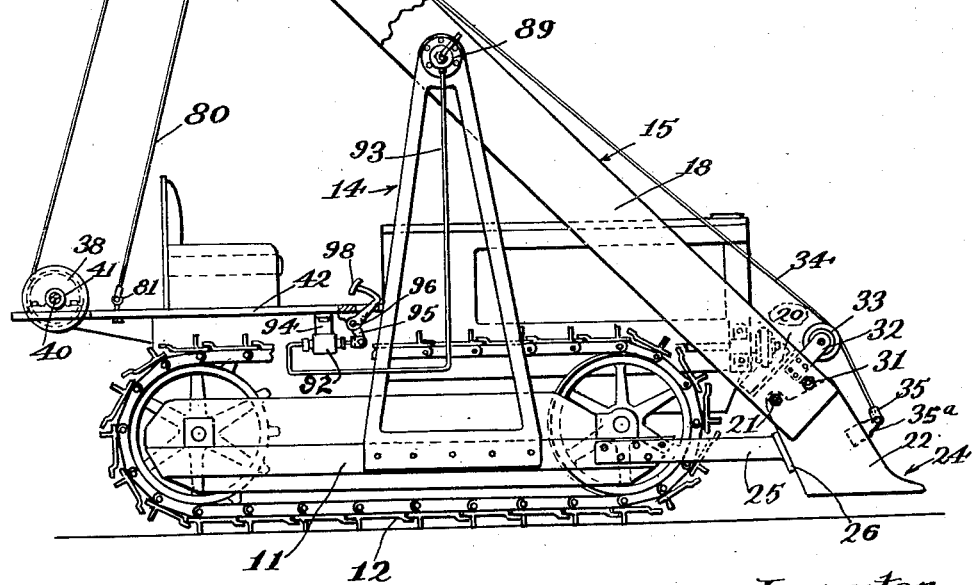
Fig. 3 is a view similar to Fig. 2 showing the beam in lowered position to receive a load of material.

Beam 15 is of preferably rectangular form consisting of longitudinal side members 18 rigidly secured together by cross bars 19 and 20 at their forward and rear ends. Pivotally mounted on the beam 18 adjacent its forward end on stud bolts or the like 21 secured to the side members 18 of the beam and projecting therefrom into its end walls 22 is an excavator 24 of the shovel or dipper type usually employed in "bulldozer" mechanisms. Secured to the side rails 11 and projecting forwardly therefrom are rigid bars 25 between which extend and are secured thereto at their outer ends a cross piece 26 which together form a direct abutment for the dipper or shovel when it is in a lowered position as shown in Fig. 3 for excavating operations.

It will be noted that when in this position the cross piece 26 engages the rear wall 28 of the dipper 24 while the upper edges 29 of each of its opposite end walls 22 engage stop pins 31 projecting from the side members of the beam so that on a forward movement of the tractor to force the dipper into a bank of earth or the like no reaction or strain will be placed upon the standards 14 or other mechanisms connected thereto.

Rotatably mounted on plates 32 secured to the side members 18 of the beam are pulleys 33 over which pass hoisting cables 34, one of their ends being connected through links 35 and brackets 35a to the side walls 22 of the dipper, while their other ends pass over pulleys 36 carried by the side members 18 and are dead ended or connected to alined hoisting drums 38. These drums are secured to each end of a shaft 40 journalled in bearings 41 mounted on the floor plate 42 of the tractor 10 which shaft is rotated through transmission from the engine of the tractor arranged as follows. Secured to the forward or projecting end of the engine crank shaft (i. e. the end to which the emergency crank for starting the engine is applied) is a sprocket 44 that drives a shaft 45 journalled in bearings 46 mounted on the tractor body through a chain 47 that engages a sprocket 48 on the end of the latter shaft. Connected to the opposite end of shaft 45 is a sprocket 49 that drives a counter-shaft 50 journalled in a bearing 51 mounted on the floor plate 42 through a chain 52 that passes over sprocket 49 and a sprocket 53 secured to the end of counter-shaft. Interposed between counter-shaft 50 and a shaft 50a is a clutch 54 operable by a lever 55 within easy reach of the tractor operator whereby the clutch may be readily engaged to operate the hoisting drums. Secured to shaft 50a is a bevel pinion 56 in mesh with a bevel gear 57 on a shaft 58 that carries a pinion 59 in mesh with a gear 60, secured to the brake drum shaft 40, and secured to the said shaft is a brake drum 62 engaged by a band 63, the brake band being tightened or released through links 61 interconnected with a lever 64. It will be understood, however, that an automatic brake of the character employed on power shovels to hold the dipper in elevated position may be employed in lieu of the construction above described.

Arranged on the beam 15 adjacent its rear end is a mechanism generally designated at 70 which serves to hold the beam in elevated position while discharging the dipper, and also acts as a counterbalance while the same is being lowered. This mechanism may be termed an automatic winder and is preferably of the construction disclosed in my U. S. Patent No. 2,166,479 entitled Tag-line device and is constructed as follows.

Mounted on plates 72 secured to the end wall 19 and a cross member 73 secured to the side members 18 of the beam 15 is a tubular housing 74 held against rotation by U bolts or the like 75. Journalled in bearings 76 disposed in the housing at each end thereof is a shaft 76 encircled by a coil spring 77 one end of which is connected to the shaft while the other end is secured to the housing as shown in Fig. 5. One end of shaft 76 projects beyond the housing and has secured thereto a pulley 78 upon which is dead ended a cable 80 the opposite end being anchored to the floor plate 42 as indicated at 81.

In assembling a sufficient length of cable is provided to permit the bucket to be lowered as shown in Fig. 3, the beam is then tilted to raise the bucket to its highest elevation, the cable wound around the pulley, the shaft being given several turns to partially wind up or apply tension to the spring and cable anchored.

Thus it will be seen that while the beam is being tilted to raise or lower the dipper the length of cable passing from the pulley to the floor plate will always be under tension, also that the spring 77 will be wound up during lowering of the dipper thereby counterbalancing its weight, i. e. to aid in raising the loaded dipper and reduce wear on the hoisting drum brake while lowering the same.

Secured to pulley 78 is another brake drum 82 in which is arranged brake band segments 83 the free ends of which are connected to the pistons (not shown) in the cylinder 84 of a hydraulic brake of usual form, the cylinder and anchor pins of the brake segments 83 are secured to a plate 85 that is mounted on cross piece 86 secured to the beam. Leading from cylinder 84 is a tube 87 the opposite end of which extends through a packing gland 88 of a housing 89 secured to one of the standards 14, it being noted that the axis of the portion of the tube and the cross shaft 16 forming the pivotal point of the beam 15 are in the same plane thereby permitting the tube to swivel in the housing and prevent twisting of it during tilting movement of the beam, the tube being supported by a bracket 90 attached to the side members of the beam.

Extending downwardly from the housing and communicating with one end of a cylinder 92 is a second tube 93. Cylinder 92 is preferably arranged below floor plate 42 and is secured thereto by a clamp or the like 94 (see Fig. 3) and has a piston therein interconnected through links 95 to a rock shaft 96 operable by a foot pedal 98. Thus it will be seen that when the foot pedal is depressed the brake segments 83 will be expanded to stop rotation of pulley 78 and thereby hold the bucket in elevated position as hereafter described. The operation of the apparatus is as follows:

The tractor 10 is moved forwardly toward a bank of earth or other material that is to be removed with the dipper 24 in lowered position as shown in Fig. 3. When the dipper has received a load or has been filled clutch 54 is engaged the action of which imparts rotation to the hoisting drums (through the transmission heretofore described) causing the dipper to be raised through cables 34, it being noted the upper edges 29 of the dipper engage the stop pins 31 on the beam at this time. After the dipper has been raised to the required elevation for example as shown in Fig. 2, foot pedal 98 is depressed and held in this position with the clutch 54 released and the hoisting drum brake applied.

Figure 2:
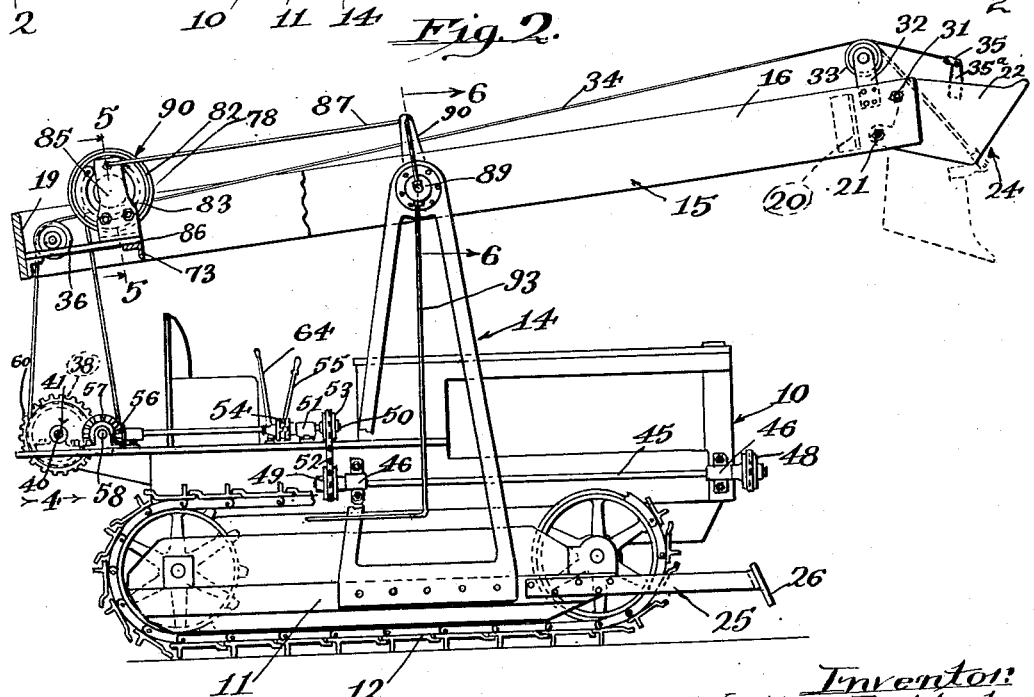
Fig. 2 is a section taken approximately on line 2—2 of Fig. 1.

The tractor is then moved to a position for dumping and the brake of the hoisting drum shaft released whereupon the weight of the material in the dipper will cause it to tilt or swing downwardly on the axis of the stud bolts 21 and discharge as indicated in dotted lines of Fig. 2, it being noted that the beam is held against downward tilting movement during dumping by the cable 80 leading from pulley 78 of the automatic winder 70 as it is then held against rotation due to application to brake drum 78. After the dipper has been discharged the brake of the hoisting drum shaft is applied and foot pedal 98 released, the action of which allows the beam to tilt downwardly (due to weight of the dipper) until the upper ends of its side walls again engage the stop pins 31. The brake on the hoisting drum shaft may then be gradually released to permit lowering of the dipper to receive another load and the operation repeated.

Referring to the construction shown in Figs. 7 and 8 the apparatus is substantially the same as that shown in Figs. 1 to 6 except that the dipper moves in a vertical plane. Secured to the side members of the beam 18 are segmental gears 100 that mesh with racks 101 extending between the uprights 102 of a frame 103 that is secured to the side members 11 of the frame. Mounted on the side member 18 of the beam are flanged rollers 104 that engage rails 105 secured to the uprights 102.

From the foregoing it will be seen that when the beam is tilted to raise the dipper it will move rearwardly due to engagement of the segmental gears 100 with the racks 101 and thereby cause the dipper to move in a vertical plane.

This construction is advantageous when it is desired to remove material to form a vertical wall.

While the invention has been described with particular reference to the embodiments disclosed on the drawings, it is to be understood that such showing is merely illustrative of the invention and is not intended to confine any restrictions thereon. The invention is best defined in the appended claims.

I claim:

1. In combination with a tractor and operating means therefor of a hoisting beam pivotally mounted on said tractor, a dipper pivotally mounted on said beam adjacent one end thereof, a hoisting drum mounted on said tractor frame, an engine, a transmission mechanism interconnected with said engine and hoisting drum, cables connecting said dipper with said hoisting drum to operate the beam to raise the dipper, a clutch interposed in said transmission mechanism for imparting rotation to said hoisting drum when elevating said dipper, means mounted on said beam for holding one end of beam in elevated position including a stationary housing secured to said beam, a shaft rotatably mounted in the housing, a spring having one end connected to the housing and the other end to the shaft, a pulley secured to the shaft, cables engaging the pulley and connected to the frame of said tractor, and a brake secured to said pulley for holding the same against rotation whereby to hold the dipper in elevated position, when discharging the contents of the dipper.

2. In combination with a tractor and operating means therefor, of a pivotally mounted beam, having a dipper pivotally mounted on its forward end, cables connected to said dipper and to the tractor operating means for raising said beam and dipper, said beam having projections thereon engageable with the side walls of the dipper to prevent it from discharging prematurely while it is being raised, and means for counterbalancing the weight of said dipper including a housing held against movement on said beam, a shaft rotatably mounted in said housing and a coil spring under tension encircling said shaft with its opposite ends connected to the shaft and housing respectively.

3. In combination with a tractor and operating means therefor, of a hoisting beam, an excavating dipper pivotally mounted on one end of said beam and means for counterbalancing the weight of the loaded dipper comprising a housing held against rotation, a shaft rotatably mounted in said housing, a pulley secured to the outer end of said shaft, a cable connected to said pulley and the tractor frame, and a spring under tension encircling said shaft with its opposite ends secured to the housing and shaft respectively.

4. In a material handling device, the combination of a tractor having a frame; an arm mounted on said frame for movement to raise and lower the outer end of said arm; a dipper mounted on the outer end of said arm and pivoted thereto for movement from material carrying position to material dumping position; a hoisting cable operatively connected to said dipper and to a winch on the tractor frame and operative to hold said dipper in material carrying position and simultaneously elevate the outer end of said arm; means including a brake connecting said arm and said frame and arranged to prevent downward movement of the outer end of said arm when the brake is set, whereby the dipper can pivot on the arm from material carrying position to material dumping position by slackening the hoisting cable.

5. In a material handling device, the combination of a tractor having a frame; a beam mounted on said frame for movement to elevate one end of said beam; a dipper mounted on said end of said beam and pivoted thereon for movement from material carrying to material dumping position; a hoisting cable operatively connected to said dipper and to a winch on the tractor frame and operative to hold said dipper in material carrying position; a sheave secured to the opposite end of said beam from said dipper, said cable passing from said dipper, over said sheave and to the winch, whereby tension of the cable also elevates the first mentioned end of the beam; a second cable; means, including said cable and yielding means, connecting the second mentioned end of the beam and the tractor frame, said connecting means permitting movement of said beam; and braking means for preventing operation of the yielding means when desired to permit dumping of the dipper by slackening the hoisting cable, said second cable maintaining the beam in elevated position when said braking means is set.

6. In a material handling device, the combination of a tractor having a frame; a beam mounted on said frame for movement to elevate one end of said beam; a dipper mounted on that end of said beam and pivoted for movement from material carrying to material dumping position; a hoisting cable operatively connected to said dipper and to a winch on the tractor frame and operative to hold said dipper in material carrying position; said cable passing over a sheave secured to the other end of said beam, whereby tension of the cable also elevates the first mentioned end of the beam; a second cable, a spring reel maintaining said cable under tension, and a brake for preventing unwinding of said reel, said cable and reel assembly being operatively connected to the second mentioned end of the beam and the tractor frame, whereby upon setting of the brake and slackening of the hoisting cable the dipper can pivot to material dumping position.

7. In a material handling device, the combination of a tractor having a frame; an arm mounted on said frame for movement to raise and lower one end of said arm; a dipper mounted on said end of the arm and movable with respect thereto from material carrying to material dumping position: means exerting a force on said dipper in a direction to hold said dipper out of material dumping position and simultaneously alter the position of the dipper carrying end of said arm; holding means for preventing downward movement of said arm while said arm is in different adjusted positions, said dipper being so mounted that relaxation of said force when said arm is held against downward movement permits the dipper to move relative to said arm to a dumping position.

8. In a material handling device, the combination of a tractor having a frame; an arm mounted on said frame for movement to raise and lower one end of said arm; a dipper mounted on said end of the arm and movable with respect thereto from material carrying to material dumping position; means exerting a force on said dipper in a direction to hold said dipper out of material dumping position and simultaneously alter the position of the dipper carrying end of said arm; holding means including a brake for preventing downward movement of said arm while said arm is in different adjusted positions, said dipper being so mounted that relaxation of said force when said arm is held against downward movement permits the dipper to move relative to said arm to a dumping position.

9. In a material handling device, the combination of a tractor having a frame; an arm mounted on said frame for movement to raise and lower the outer end of said arm; a dipper mounted on the outer end of said arm and movable with respect thereto from material carrying to material dumping position; a hoisting cable connected to said dipper at such a point as to hold said dipper out of material dumping position and lift the outer end of said arm when a tension is applied to said cable; and means including a brake connecting said arm and said frame for holding the outer end of said arm against downward movement while said arm is in adjusted position, said dipper being so mounted that relaxation of the tension of said cable when said brake means is set permits movement of said dipper relative to said arm to material dumping position.

10. In a material handling device, the combination of a tractor having a frame; an arm mounted on said frame intermediate its ends for movement to raise and lower one end of said arm; a dipper mounted on said end of said arm and movable with respect thereto from a material carrying to material dumping position; means exerting a force on said dipper in a direction to hold said dipper out of material dumping position and simultaneously alter the position of the dipper carrying end of said arm; holding means including a brake connecting the other end of the arm and the tractor frame for preventing downward movement of the dipper carrying end of said arm while said arm is in different adjusted positions, said dipper being so mounted that relaxation of said force when the dipper carrying end of said arm is held against downward movement permits the dipper to move relative to said arm to a dumping position.

11. In a material handling device, the combination of a tractor having a frame; an arm mounted on said frame intermediate its ends for movement to raise and lower one end of said arm; a dipper mounted on said end of said arm and pivoted thereto for movement from material carrying position to material dumping position; a hoisting cable operatively connected to said dipper and to a winch on the tractor frame and operative to hold said dipper in material carrying position and simultaneously elevate the dipper carrying end of said arm; means including a brake connecting the other end of said arm and said frame and arranged to prevent downward movement of the dipper carrying end of said arm when the brake is set, whereby the dipper can pivot on the arm from material carrying position to material dumping position upon slackening the hoisting cable.

12. In a material handling device, the combination of a tractor having a frame; a beam pivoted on said frame intermediate its ends to raise and lower one end of said beam; a dipper mounted on said end of the beam and pivoted for movement with respect thereto from material carrying position to a material dumping position; a hoisting cable connected to said dipper, a sheave on the opposite end of said beam from said dipper; a winch on said tractor frame; said hoisting cable running from said dipper over said sheave to said winch, whereby said winch elevates the dipper carrying end of said beam and simultaneously holds the dipper out of material dumping position; a brake on said winch; and means including a second brake for preventing downward movement of the dipper carrying end of said beam, whereby release of the first mentioned brake when the second mentioned brake is applied permits the bucket to pivot to a material dumping position.

WILLIAM RUDDOCK